(12) United States Patent
Valles

(10) Patent No.: US 6,590,385 B2
(45) Date of Patent: Jul. 8, 2003

(54) VARIABLE RELUCTANCE SENSOR ASSEMBLY WITH MAGNETIC SPOOL

(75) Inventor: Benjamin Valles, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/900,804

(22) Filed: Jul. 6, 2001

(65) Prior Publication Data

US 2003/0006760 A1 Jan. 9, 2003

(51) Int. Cl.[7] .......................... G01P 3/488; G01B 7/30; H01F 1/00; H01F 7/02
(52) U.S. Cl. ............. 324/174; 324/207.15; 324/207.25; 252/62.54; 335/296; 428/611
(58) Field of Search ................................ 324/173, 174, 324/207.15, 207.24, 207.25; 148/101–103; 335/205, 296, 297, 302; 73/514.39; 252/62.53, 62.54; 123/406.58, 617; 428/611, 900

(56) References Cited

U.S. PATENT DOCUMENTS

| | | | | |
|---|---|---|---|---|
| 3,668,176 A | * | 6/1972 | Childress | ................. 252/62.54 |
| 4,045,738 A | * | 8/1977 | Buzzell | ....................... 324/174 |
| 5,486,758 A | * | 1/1996 | Hammerle | ................... 324/174 |
| 5,504,424 A | * | 4/1996 | Graf et al. | .................... 324/174 |
| 5,563,510 A | * | 10/1996 | Gorrell et al. | ............... 324/174 |
| 6,053,046 A | * | 4/2000 | Masaki et al. | .......... 324/174 X |
| 6,116,863 A | * | 9/2000 | Ahn et al. | |
| 6,169,481 B1 | * | 1/2001 | Goldberg et al. | ... 324/207.24 X |

* cited by examiner

Primary Examiner—Gerard R. Strecker
(74) Attorney, Agent, or Firm—Margaret A. Dobrowitsky

(57) ABSTRACT

A sensor assembly includes a spool that has magnetic filaments incorporated therein. The magnetic filaments are magnetized to create a magnetic flux around the spool. A coil is wound around the spool such that it is within the magnetic flux field generated by the spool. A target wheel having plural teeth and plural slots is placed so that its outer periphery is slightly spaced from the target wheel. As the target wheel rotates, it induces changes in the magnetic flux density sensed by the coil. The changes in flux density can be used to determine the angular position and angular speed of the target wheel and a moving part attached thereto. Since the spool is magnetized, the need for a separate magnet is obviated.

8 Claims, 1 Drawing Sheet

VARIABLE RELUCTANCE SENSOR ASSEMBLY WITH MAGNETIC SPOOL

TECHNICAL FIELD

The present invention relates generally to variable reluctance sensors.

BACKGROUND OF THE INVENTION

Modern motor vehicles are equipped with numerous sensors that enhance the safety and quality of the vehicle operation. Some of these sensors are variable reluctance (VR) sensors that translate mechanical motion into electrical signals that can be useful, e.g., knowing the angular position and angular speed of an engine crank. VR sensors generate their own electrical pulses and as such, a supply voltage is not required.

In general, a typical VR sensor assembly includes a coil wound around a spool. The spool is disposed around a metal pole piece and a magnet is placed in proximity to the pole piece, e.g., adjacent to the end of the pole piece. The magnet creates a magnetic flux field around the pole piece and the coil. A target wheel, usually associated with rotating part, e.g., a crank shaft, is placed near the end of the VR sensor. The target wheel includes plural teeth and as it rotates, the teeth induce changes in the magnetic flux field that cause the coil to generate electrical pulses that correspond to the changes in the magnetic flux field. Accordingly, the electrical pulses can be processes to determine the angular position and angular speed of the, e.g., crank shaft.

As described above, VR sensors do not include any moving parts internal to the sensor. The output performance of VR sensors depends on the number of wire turns and the rate of flux changes over time. This relationship is given by the formula:

$$V=(N*d\phi/dt)$$

where:

V is the voltage output by the sensor;

N is the number of wire turns in the coil; and dø/dt is the rate of change of the flux over time.

As recognized by the present invention, it is possible to magnetize the spool, eliminate the need for a separate magnet, and achieve the same functionality as current VR sensors.

SUMMARY OF THE INVENTION

A sensor assembly includes a spool that has magnetic filaments disposed therein. The magnetic filaments are magnetized to create a magnetic flux around the spool. A coil is wound around the spool and the coil is disposed within the magnetic flux generated by the spool. Also, a pole piece is disposed within the spool.

Preferably, the sensor assembly further includes a target wheel that rotates relative to the sensor assembly. In a preferred embodiment, the target wheel induces changes in the magnetic flux. These changes in the magnetic flux are sensed by the coil as the target wheel rotates. In a preferred embodiment, the coil is electrically connected to a microprocessor that receives signals representing changes in the magnetic flux density sensed by the coil. The microprocessor processes the signals to determine the relative motion between the target wheel and the sensor assembly. In a preferred embodiment, the magnetic piece has a elliptical cross-section.

Preferably, the sensor assembly includes a rotating vehicle part that is connected to the target wheel and a stationary vehicle part that is connected to the sensor assembly. The microprocessor determines the relative motion between the rotating part and the stationary part. Preferably, the magnetic filaments are evenly dispersed throughout the spool, but they can also be unevenly dispersed throughout the spool.

In another aspect of the present invention, a variable reluctance sensor assembly includes a magnetic spool with a coil disposed therearound. The magnetic spool generates a magnetic flux field around the coil. In this aspect of the present invention, a target wheel is rotatably disposed adjacent to the spool. The target wheel is configured so that it rotates adjacent to the spool it induces changes in the magnetic flux field sensed by the coil.

In yet another aspect of the present invention, a variable reluctance sensor assembly includes a spool that has a coil disposed therearound. The spool includes means for allowing the spool to be magnetized so that the spool generates a magnetic flux field around the coil. In this aspect, the variable reluctance sensor also includes means for inducing changes in the magnetic flux field sensed by the coil.

The present invention will now be described, by way of example, with reference to the accompanying drawings, in which:

DESCRIPTION OF AN EMBODIMENT OF THE INVENTION

Figure 1:
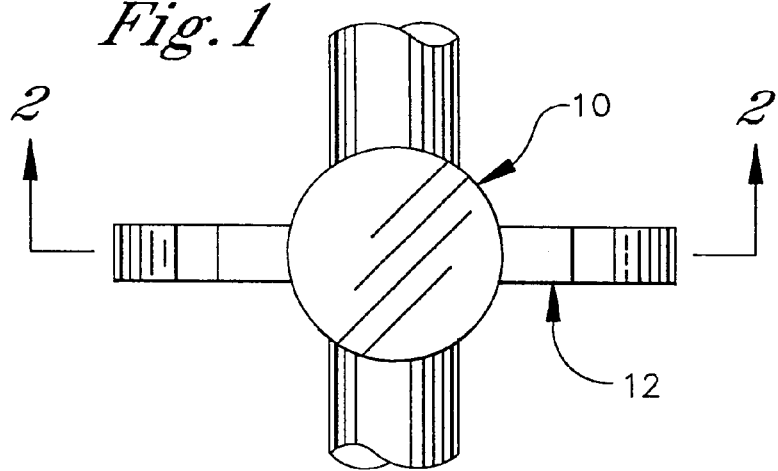
FIG. 1 is a top view of the sensor assembly.
Figure 2:
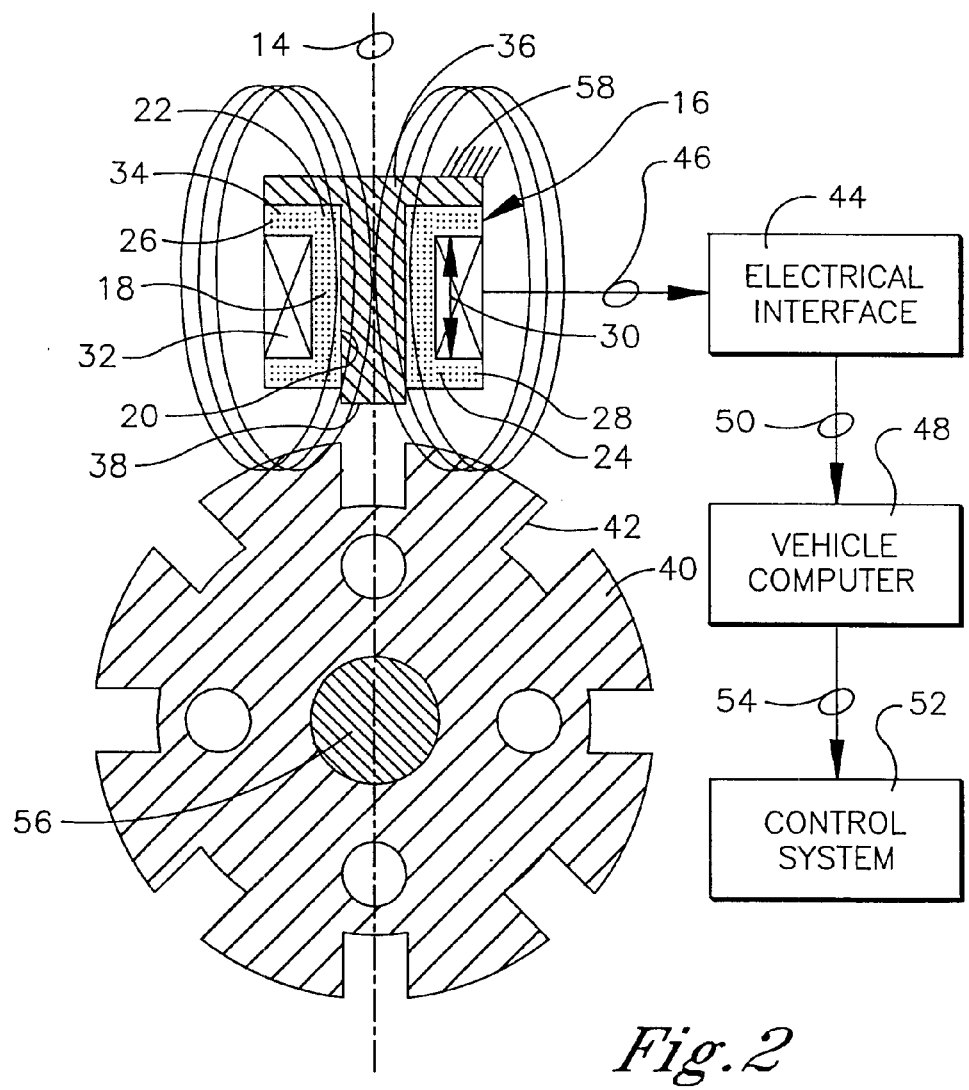
FIG. 2 is a cross-section view of the sensor assembly taken along line 2—2 in FIG. 1.

Referring to FIGS. 1 and 2, a variable reluctance sensor assembly, generally designated 10, is placed adjacent to a target wheel, generally designated 12. As shown, the sensor assembly 10 defines a central axis 14 with which the center of the target wheel 12 is aligned. FIG. 2 shows that the sensor assembly 10 includes a spool 16 having a hollow, generally cylindrical central post 18 that defines a central space 20. As shown, the post 18 defines a first end 22 and a second end 24. FIG. 2 shows a flat, hollow, generally disk-shaped first end plate 26 that extends radially around the first end 22 of the post 18 such that it circumscribes the first end 22 of the post 18 and the central space 20. Furthermore, a flat, hollow, generally disk-shaped second end plate 28 extends radially around the second end 24 of the post 18 so that it circumscribes the second end 24 of the post 18 and the space 20.

As shown in FIG. 2, the second end plate 28 is distanced from the first end plate 26 to establish a winding area 30 around the outside surface of the post 18 between the plates 26, 28. FIG. 2 shows that a wire is wound around the post 18 within the winding area 30 to form a coil 32 around the spool 16. In a preferred embodiment, the spool 16 is an injection molded component made mostly of plastic. However, the spool 16 is molded with magnetic filaments 34, e.g., ferrous filaments, dispersed preferably uniformly throughout the plastic parts of the spool 16. After the spool 16 is molded, the magnetic filaments 34 allow the spool 16 to be magnetized. Thus, the spool 16 serves two functions: it supports the coil 32, and it acts as a magnet. Preferably, the magnetic filaments 34 are dispersed evenly and consistently throughout the entire spool 16. It is to be appreciated that the spool 16 can be molded by first thoroughly mixing the filaments 34 into molten plastic, so that the filaments 34 are evenly dispersed throughout the molten plastic and then, injecting the molten plastic/filament mixture into a mold. However, it is also to be appreciated that the magnetic filaments 34 can be denser in one area of the spool 16 than other areas to create a magnetic flux density greater in that area of the spool 16.

FIG. 2 also shows a generally "T" shaped pole piece 36 that is disposed within the spool 16, i.e., within the central space 20 formed by the post 18. Preferably, the pole piece 36 is made from steel. As shown, the pole piece 36 includes a sensing tip 38 that extends beyond the second end plate 28 of the spool 16. As shown, the sensing tip 38 is slightly spaced from the outer periphery of the target wheel 12. FIG. 2 shows that the target wheel 12 is alternatingly formed with plural teeth 40 and plural slots 42 around its outer periphery. Preferably, the teeth 40 and slots 42 are evenly spaced around the outer periphery of the target wheel 12.

As shown in FIG. 2, the coil 32 is electrically connected to an electrical interface 44 via electric line 46. In turn, a vehicle microprocessor 48 is connected to the electrical interface 44 via electric line 50. Moreover, a control system 52 is connected to the vehicle microprocessor 48 via electrical line 54.

Operation

As the target wheel 12 rotates relative to the coil assembly 10, the transitions from tooth to slot to tooth, etc. induce changes in the flux field generated by the magnetic spool 16 owing to the magnetic filaments 34. The changes in the flux field cause the coil 32 to generate signals, i.e., electrical pulses, that are sent to the microprocessor 48. Accordingly, the microprocessor 48 processes the signal to determine the angular position and angular speed of the target wheel 12. In turn, the microprocessor 48 can send a signal representing the angular position and angular speed to a control system 52 to be used as necessary to control the operation of the vehicle.

As shown in FIG. 2, the target wheel 12 can be attached to a rotating part 56, e.g., a shaft, and the sensor assembly 10 can be attached to a stationary part 58, e.g., a housing. Thus, the relative motion between the rotating part 56 and the stationary part 58 can be determined relatively accurately.

With the configuration of structure described above, it is to be appreciated that the VR sensor assembly 10 in which the magnetic spool 16 is incorporated can be used to determine the relative motion between a rotating part and a stationary part. Since the spool 16 is magnetized, the need for a separate magnet is eliminated and costs are manufacturing costs associated with the VR sensor 30 are reduced. Moreover, the elimination of a separate magnet reduces the overall package size of the VR sensor assembly 10.

While the particular VARIABLE RELUCTANCE SENSOR ASSEMBLY WITH MAGNETIC SPOOL as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

I claim:

1. A sensor assembly, comprising:
   a spool having magnetic filaments disposed therein, the magnetic filaments being unevenly dispersed throughout the spool, the magnetic filaments being magnetized to create a magnetic flux around the spool;
   a coil wound around the spool, the coil being at least partially disposed within the magnetic flux generated by the spool; and
   a pole piece disposed within the spool.

2. The sensor assembly of claim 1, further comprising:
   a target wheel, the target wheel rotating relative to the sensor assembly, the target wheel inducing changes in the magnetic flux sensed by the coil as the target wheel rotates.

3. The sensor assembly of claim 2, wherein the coil is electrically connected to a microprocessor, the microprocessor receiving signals representing changes in the magnetic flux density sensed by the coil, the microprocessor processing the signals to determine the relative motion between the target wheel and the sensor assembly.

4. The sensor assembly of claim 3, further comprising:
   a rotating vehicle part connected to the target wheel; and
   a stationary vehicle part connected to the sensor assembly, the microprocessor determining the relative motion between the rotating part and the stationary part.

5. A variable reluctance sensor assembly, comprising:
   a magnetic spool having a coil disposed therearound, the magnetic spool generating a magnetic flux field around the coil;
   plural magnetic filaments unevenly dispersed throughout the spool; and
   a target wheel rotatably disposed adjacent to the spool, the target wheel being configured to induce changes in the magnetic flux field sensed by the coil as the target wheel rotates.

6. The sensor assembly of claim 5, further comprising:
   a pole piece disposed within the spool.

7. The sensor assembly of claim 5, wherein the coil is electrically connected to a microprocessor, the microprocessor receiving signals representing changes in the magnetic flux density sensed by the coil, the microprocessor processing the signals to determine the relative motion between the target wheel and the sensor assembly.

8. The sensor assembly of claim 7, further comprising:
   a rotating part connected to the target wheel; and
   a stationary part connected to the coil assembly, the microprocessor determining the relative motion between the rotating part and the stationary part.

* * * * *